United States Patent Office 3,159,585
Patented Dec. 1, 1964

3,159,585
METHOD OF ENCAPSULATING WATER INSOLUBLE OILS AND PRODUCT THEREOF
Raymond B. Evans, Catonsville, Md., and William Herbst, Watchung, N.J., assignors to National Starch and Chemical Corporation, New York, N.Y., a corporation of Delaware
No Drawing. Filed Apr. 12, 1961, Ser. No. 102,392
3 Claims. (Cl. 252—316)

This invention relates to a method for the encapsulation of volatile materials and to the encapsulated products thus obtained.

This invention relates more particularly to the preparation and use of improved encapsulating dextrins and to the encapsulated products derived therefrom. It is the object of this invention to provide dextrins for use in the encapsulation of volatile materials such as flavoring oils and perfumes. A further object involves the preparation of encapsulating dextrins which are superior in their encapsulating ability to the dextrins and other materials heretofore employed for this purpose and which are, furthermore, free from the characteristic color, aroma and taste ordinarily associated with such encapsulating dextrins.

The use of volatile flavoring oils and perfumes in such applications as foods and cosmetics is often greatly hampered by the rapid evaporation and consequent loss of the volatile component. Thus, although the practitioner may prepare a food, cosmetic or other product which initially contains the appropriate degree of flavor or fragrance, the ultimate consumer often finds that there has been a considerable reduction in these properties. This loss will, of course, detract from the desirability as well as from the utility of the products concerned. In addition to foods and cosmetics, this problem is similarly encountered in other situations wherein it is necessary to entrap volatile substancces as, for example, in connection with pharmaceuticals, detergents and the like.

Various techniques have been proposed in an effort to overcome this problem. These procedures generally involve the preparation of soild compositions containing the volatile ingredient entrapped therein. Such compositions may be prepared, for example, by mixing the volatile oil with a suitable absorbent base. In another method, the volatile materials are dispersed with solutions of various protective colloids, in which form they are then dried and ground.

Of late, the technique of spray drying has found wide acceptance as a means for preparing solid particles containing entrapped flavors, perfumes or other water-insoluble, volatile substances. In this technique the volatile oils are first emulsified in an aqueous solution or dispersion of a water-dispersible protective colloid such as gelatine, gum arabic, starch, or dextrin. This emulsion is then sprayed into a column of heated air or gases thereby evaporating the water from the emulsion. It is believed that the dry particles resulting from the spray drying process comprise a shell or capsule of the dried colloid, in which the oil is embedded or encapsulated in the form of minute droplets. The oil may also possibly be absorbed in the colloid base.

In addition to the spray drying procedure, other means of drying the above described emulsions have also been proposed. Thus, they may be spread on belts and passed through drying tunnels, or they may be passed over heated drums or the like. In all cases, however, spray drying and these other related drying techniques permit the practitioner to put volatile, water-immiscible oils or other substances into a solid, highly water-dispersible form which readily lends itself to blending with a wide variety of other ingredients, while also offering protection against the evaporation of the volatile component from the dry particles. Among the possible applications for such encapsulated oil particles, one may list their use in foods, cosmetics, spices, pharmaceuticals, soaps, detergents, bleaches, and cleansers. Since any active ingredient may be thus entrapped, other suitable uses will be apparent to those skilled in the art.

As has been noted, dextrins are among the water-dispersible protective colloids which may be employed in the preparation of emulsions for use in spray drying. As is known in the art, dextrins are the conversion products formed by the incomplete hydrolysis of starch as a result of the action of dilute acids or by the heating of the dry starch. Although dextrins provide efficient encapsulating agents and are considerably lower in cost than such colloids as gelatin and gum arabic, their use in the preparation of spray dried perfumes and oils has, nonetheless, been limited. These limitations on the use of dextrins result from the charactertistic aroma, taste and dark color which are ordinarily associated with dextrins and which are, in turn, imparted to the resulting encapsulated, sray dried products.

Obviously the presence of this color along with the dextrin aroma and taste are highly undesirable in these spray dried products and particularly in the case of spray dried perfumes and flavoring oils. In an effort to alleviate this problem, attempts have been made to employ dextrins which have been subjected to a lesser degree of conversion so as to produce products which were lighter in color and which had a less pronounced taste and aroma. However, these mildly converted dextrins have not been successful as encapsulating agents since their encapsulating ability, as described in terms of the percent of volatile oil which is lost during the spray drying process, is considerably inferior to the more highly converted dextrins.

We have now discovered that the use of a particular type of dextrin as an encapsulating agent provides spray dried products which are free from the characteristic color, aroma and taste which have heretofore been associated with the use of ordinary dextrins. Moreover, our encapsulating dextrins have, surprisingly, been found to be superior in their encapsulating ability to these conventional dextrins as well as to various other encapsulating colloids such as gum arabic and gelatin. This superior encapsulating ability is believed to result from the finer particle size of the emulsions which are prepared from our encapsulating dextrins; this factor, in turn, resulting in spray dried products which exhibit a volatile oil loss substantially lower than that which is noted in the case of the spray dried products made with ordinary dextrins and other encapsulating colloids.

The encapsulating agents of our invention comprise dextrins derived from oxidized starches containing a controlled amount of carboxyl groups. These dextrins, in order to function efficiently as encapsulating agents in the process of our invention, should, preferably, have a total carboxyl group (i.e. —COOH) content of from 0.15% to 1.25%, by weight.

These carboxylated dextrins are, preferably, prepared from oxidized cereal starches such as corn, wheat, waxy maize and waxy sorghum starches. Carboxylated dextrins derived from oxidized root starches, such as tapioca and potato starches, may also be employed where desired by the practitioner. However, although the latter materials are less efficient in their encapsulating ability as compared with the carboxylated dextrins derived from oxidized cereal starches, these carboxyl containing root starches are, nonetheless superior in their encapsulating ability to carboxyl free dextrins prepared from the comparable unoxidized root starches. Moreover, all of these carboxylated dextrins are fully compatible with all types of volatile oils, perfumes, flavors and other relatively water-insoluble substances, yielding encapsulated products which are devoid of any color, aroma or taste which is ordinarily associated with uncarboxylated dextrins.

In preparing oxidized starches applicable for conversion to the carboxylated dextrin encapsulating agents of our invention, the practitioner may employ any reagent capable of oxidizing the hydroxyl groups (i.e. —OH), of the starch molecule thereby converting the latter into carboxyl groups in a concentration range falling within the above stated limits. Especially convenient are the halogen containing reagents such as sodium hypochlorite which may be employed in the form of an aqueous solution. Another oxidizing reagent which may also be employed is nitrogen tetroxide. The concentration at which these oxidizing reagents should be used as well as the proper reaction conditions required to prepare these oxidized starches with the desired range of carboxyl content, can readily be determined on the part of the practitioner as well as by reference to the descriptive examples subsequently presented herein.

In converting these oxidized starches into dextrins, one may employ any of the usual dextrinization procedures well known to those skilled in the art, including treatment of starch with either heat or acid or by any other means desired by the practitioner. Additional information relating to both the oxidation and dextrinization of starches, in addition to the descriptive examples presented herein, may also be obtained by reference to chapters XI–XIII of "Chemistry and Industry of Starch," by R. W. Kerr, published in 1950 by the Academic Press of New York, N.Y. It should be noted that although our carboxylated encapsulating dextrins are ordinarily prepared by the dextrinization of an oxidized starch, it is also possible for the practitioner to prepare these products by first dextrinizing a raw starch and then oxidizing the resulting dextrin.

In using these carboxylated dextrins as encapsulating agents for the entrapment of volatile oils and other water insoluble substances, it is first necessary to disperse or dissolve them in water. This is usually accomplished, under agitation, with the water being heated to a temperature of from 100° to 210° F. After solution of the dextrin is complete, the volatile substance which is to be entrapped (e.g. oil, perfume or the like) is slowly added and the mixture is rapidly agitated until such time as emulsification is complete.

The resulting emulsion may then be dried by any suitable means, preferably by spray drying, although as noted earlier, drying may also be effected by passage of the emulsion over heated drums or by spreading it on belts which are then passed through a heating tunnel. The preferred spray drying technique may be accomplished using any commercially available spray drying equipment capable of providing an inlet temperature in the range of approximately 350° to 520° F. When drying by means other than spray drying, it is ordinarily necessary to grind the resultant dried material to the desired particle size.

Regardless of the drying procedure which is employed, the resulting encapsulated particles are, in all cases, dry, stable, free flowing solids which are easily handled by conventional mixing or packaging apparatus without danger of breakage or other damage. When these particles are brought into contact with water, by immersion or moistening, they soon dissolve thereby releasing their entrapped oils. Moreover, these encapsulated particles are free from the characteristic color, taste and aroma ordinarily associated with uncarboxylated dextrins.

In those cases where the desired solubility of our carboxylated dextrins is incomplete or limited, it may be convenient to treat these dextrins, prior to their ultimate dispersion, so as to effectively increase their solubility. This may be accomplished by a variety of techniques. One such procedure involves cooking the dextrin for about 15–20 minutes in water which is at a temperature of about 70°–80° F. and then merely spray drying the resulting solution. The spray dried dextrin, which is readily soluble in cold water, may then be employed in the above described emulsification procedure. Another technique involves cooking the dextrin, under agitation, for about twenty minutes in water which is at a temperature of about 150°–180° F. These cooked dispersions are then brought back to their original weight by the addition of water, so as to compensate for any water loss effected by evaporation, and thereupon cooled to a temperature of about 75°–90° F. These cooked dextrins may then be employed in the above described procedure, having now been fully dispersed and requiring only the addition of the volatile oil and subsequent agitation period so as to complete the emulsification process.

With regard to proportions, there are no critical limits. The aqueous dispersions of these carboxylated dextrins may ordinarily contain from about 20% to 50%, by weight, of these materials. The amount of volatile oil which may then be emulsified in these dispersions is also subject to variation, depending upon the particular dextrin and the oil which is being emulsified. Thus, in some cases, one may encapsulate as much as 50% of the substance to be entrapped, as based upon the total weight of the encapsulating dextrin present in the dispersion.

The following examples will more fully illustrate the embodiment of our invention. In these examples, all parts given are by weight, unless otherwise noted.

*Example 1*

This example illustrates the preparation of a carboxylated dextrin suitable for use as an encapsulating agent in the process of our invention.

In preparing this carboxylated dextrin, we first suspended 500 parts of corn starch, as weighed on a dry basis, in 700 parts of water which was at a temperature of 85° F. With continuous stirring, we then added 250 parts of an aqueous sodium hypochlorite solution containing 25 parts of active chlorine, an amount equivalent to 5% of chlorine on the weight of the dry starch. This hypochlorite solution was added over a two hour period and during this time the pH of the starch suspension was maintained at a value of 7.5±0.1 by the addition of small amounts of 20° Bé. hydrochloric acid. Following the addition of the hypochlorite, the oxidation reaction was allowed to proceed for an additional 5 hours and during this period the pH of the mixture was again maintained at a level of 7.5±0.1 by the addition, as needed, of portions of a 10%, by weight, solution of sodium hydroxide.

After a total reaction time of seven hours had elapsed, the oxidation was completed and 0.25 part of sodium bisulfite, dissolved in a minimum amount of water, were added to the dispersion so as to effectively remove any residual, unreacted chlorine. The mixture was then acidified to a pH of 2.2–2.5 by the addition of 20° Bé. hydrochloric acid and was then stirred for two hours. Following this treatment, the starch was filtered and washed several times with water so as to remove the free acid and salts, and finally dried to a moisture content of about 10%.

The oxidized corn starch produced by this procedure had a total carboxyl group content of 0.95%, by weight.

In converting this oxidized corn starch to a dextrin, it was acidified by spraying with dilute hydrochloric acid until its pH, as measured by suspending one part of the acidified starch in 4 parts of water, was at a value of 3.00. This conversion was carried out on a belt type converter running at a 15 minute heating period with the final temperature being 375° F.

The resulting dextrin, hereinafter referred to as Sample 1, was off-white in color and was free from the taste and aroma ordinarily associated with dextrins. Its carboxyl content corresponded to that noted for the oxidized starch base. This carboxylated dextrin was 91.6%, by weight, soluble in water which was at a temperature of 72° F. and it contained 32.7%, by weight, of under converted material (i.e. undextrinized starch), hereinafter referred to by the designation UCM. The viscosity of this dextrin, as expressed in terms of its anhydrous borax fluidity value, hereinafter referred to as the ABF value, was 2.84. (The ABF value is defined as the ratio of the amount of water to the amount of dextrin when the latter is cooked for 5 minutes at 195° F. with 15% of borax on the weight of the dextrin, so as to provide a dispersion having a viscosity, when cooled to 77° F., of 70 centipoises.)

In repetitions of the above described procedure, the identical process variables were employed with the following exceptions:

*Sample 2.*—The final temperature during the dextrinization was 365° F.

*Sample 3.*—The final temperature during the dextrinization was 385° F.

*Sample 4.*—During the dextrinization the oxidized starch was acidified to a pH of 2.88.

*Sample 5.*—During the dextrinization the oxidized starch was acidified to a pH of 3.20.

*Sample 6.*—During the oxidation reaction, we employed 69 ml. of aqueous sodium hypochlorite solution containing 5 grams of active chlorine, equivalent to 1% chlorine on the weight of the starch.

*Sample 7.*—During the oxidation reaction, we employed 138 ml. of aqueous sodium hypochlorite solution containing 10 grams of active chlorine, equivalent to 2% chlorine on the weight of the starch.

*Sample 8.*—Tapioca starch was substituted for corn starch.

*Sample 9.*—Potato starch was substituted for corn starch and the final temperature during the dextrinization was 360° F.

All of the carboxylated dextrins which were produced by means of the above described variations were off-white in color and were free from the taste and aroma ordinarily associated with conventional dextrins. The physical properties of these dextrins are presented in the following table.

|  | Sample No. | | | | | | | |
|---|---|---|---|---|---|---|---|---|
|  | 2 | 3 | 4 | 5 | 6 | 7 | 8 | 9 |
| Percent Total COOH Groups | 0.95 | 0.95 | 0.95 | 0.95 | 0.17 | 0.35 | 1.13 | 1.20 |
| pH (1 dextrine: 4H$_2$O) | 3.00 | 3.00 | 2.88 | 3.20 | 3.13 | 3.08 | 3.70 | 3.77 |
| ABF Value | 3.00 | 2.69 | 2.58 | 3.04 | 2.13 | 2.33 | 2.61 | 2.62 |
| Percent UCM | 37.8 | 24.6 | 23.8 | 32.8 | 10.5 | 15.0 | 21.5 | 37.8 |
| Percent H$_2$O Solubility at 72° F | 92.7 | 99.5 | 99.0 | 87.0 | 84.7 | 100 | ~9.7 | ~9.3 |

All of the above described carboxylated dextrins were successfully employed as encapsulation agents for the preparation of spray dried products.

*Example II*

This example illustrates the superior encapsulating ability of one of our carboxylated dextrins in comparison with the undextrinized, oxidized starch from which it was derived.

An emulsion was prepared from the carboxylated dextrin, Sample 1, whose preparation and properties were described in Example I, by dispersing 150 parts of the latter into 300 parts of water which was at a temperature of 70°–75° F. In the case of the oxidized corn starch base, it was first necessary to cook it for 20 minutes in water which was at a temperature of 170° F. The dispersion was then brought back to its original weight by the addition of water and thereupon cooled to 70°–75° F. Agitation of each of the mixtures was continued until solution was complete whereupon 37.7 parts of lemon oil, having a specific gravity of 0.85, were slowly added to each solution with agitation being maintained for 5 minutes after which time emulsification was complete. The resulting emulsions thus contained 20%, by weight, of lemon oil as calculated on the dry weight of the final spray dried product.

The emulsions were spray dried using a spray drier whose inlet temperature was 180°±5° F. and whose outlet temperature was 100°±5° F. The resulting spray dried particles, from both the oxidized starch base and the carboxylated dextrin emulsions, were dry, stable, free-flowing solids which were easily handled without any breakage or other damage. The particles encapsulated with my carboxylated dextrin were free from the characteristic color, odor and taste ordinarily associated with dextrin products.

In order to compare the encapsulating ability of the carboxylated dextrin and its oxidized starch base, we employed standard analytical techniques to determine the amount of lemon oil which was lost during the spray drying of each of the respective emulsions. The results are presented below.

Encapsulating agent: Percent oil loss
  Carboxylated corn dextrin of Sample 1, Ex. I _____ 6.8
  Carboxylated corn starch base of Sample 1, Ex. I _____ 17.6

*Example III*

This example compares the encapsulating ability of our carboxylated dextrins with gum arabic and with comparable uncarboxylated dextrins.

Emulsions were prepared from each of the encapsulated agents described below by dispersing 150 parts of each into 300 parts of water which was at a temperature of 70°–75° F. Agitation of each of the mixtures was continued until solution was complete whereupon 37.7 parts of lemon oil, having a specific gravity of 0.85, were slowly added to each solution with agitation being maintained for 5 minutes after which time emulsification was complete. The resulting emulsions thus contained 20%, by weight, of lemon oil as calculated on the dry weight of the final spray dried product.

The emulsions were then spray dried using a spray drier whose inlet temperature was 180°±5° F. and whose outlet temperature was 100°±5° F. The resulting spray dried particles were, in all cases, dry, stable, free-flowing solids which were easily handled without any breakage or other damage. The following table describes the various encapsulating agents which were employed and presents data on their encapsulating ability, as expressed in terms of the amount of lemon oil which was lost during the spray drying of each of the respective emulsions. In this table the abbreviations "Stand," "dex." and "Carb." represent, respectively, "Standard," "dextrin" and "Carboxylated."

| Encapsulating Agent | ABF | pH (1 dex.: 4H$_2$O) | Percent Oil Loss |
|---|---|---|---|
| Gum arabic | | | 9.1 |
| Carb. corn dex., Sample 1, Ex. I | 2.84 | 3.00 | 6.8 |
| Stand. white corn dex | 1.86 | 4.50 | 20.5 |
| Carb. corn dex., Sample 5, Ex. I | 3.04 | 3.20 | 2.6 |
| Stand. canary corn dex | 2.09 | 4.00 | 9.9 |
| Carb. corn dex., Sample 6, Ex. I | 2.13 | 3.13 | 9.1 |
| Stand. white corn dex | 2.88 | 5.80 | 26.2 |
| Carb. corn dex., Sample 7, Ex. I | 2.33 | 3.08 | 8.8 |
| Stand. white corn dex | 2.10 | 5.80 | 21.6 |
| Carb. tapioca dex., Sample 8, Ex. I | 2.61 | 3.70 | 18.8 |
| Stand. tapioca dex | 2.80 | 4.40 | 29.9 |
| Carb. potato dex., Sample 9, Ex. I | 2.62 | 3.77 | 25.7 |
| Stand. potato dex | 2.80 | 5.30 | 33.3 |

The above data clearly indicates the superior encapsulating ability of our carboxylated dextrins as compared with comparable dextrins derived from the same starch base. It should also be noted that with the exception of the carboxylated tapioca and potato dextrins, our encapsulating agents were all superior to gum arabic in their encapsulating ability. The carboxylated tapioca and potato dextrins, although inferior in their encapsulating ability to carboxylated corn dextrins, were nonetheless superior to their respective uncarboxylated tapioca and potato dextrins in regard to their encapsulating ability as well as to the absence, in the final spray dried products, of the characteristic odor and taste ordinarily associated with these dextrins. In addition to their use in the preparation of encapsulated lemon oil particles, the dextrins of Samples 1, 5, 6, 7, 8 and 9 were all used in the encapsulation of the following materials: vegetable fat, strawberry flavoring, eugenol, and oil of cassia. The resulting spray dried products were all comparable in their properties to the above described encapsulated lemon oil particles.

Summarizing, our invention is thus seen to provide the practitioner with an improved encapsulating dextrin of superior encapsulating ability. Variations may be made in proportions, procedures and materials without departing from the scope of this invention which is limited only by the following claims.

We claim:

1. A method of encapsulating water insoluble oils which comprises making an aqueous dispersion of an encapsulating agent consisting essentially of a carboxylated dextrin having a total carboxyl group content of from 0.15% to 1.25%, by weight, emulsifying in said dispersion the oil to be encapsulated, and then drying the emulsion by spraying the same directly into a column of heated gas, said carboxylated dextrin being derived from a starch selected from the class consisting of cereal starches.

2. A method for encapsulating water insoluble oils which comprises making an aqueous dispersion of an encapsulating agent consisting essentially of a carboxylated dextrin having a total carboxyl group content of from 0.15% to 1.25%, by weight, the dispersion containing from about 20% to 50%, by weight, of said encapsulating agent, emulsifying the water insoluble oil in said dispersion, and then spray drying the emulsion by directly spraying the same into a column of heated gas, thus forming dry, free flowing particles containing the oil encapsulated therein, said carboxylated dextrin being derived from a starch selected from the class consisting of cereal starches.

3. A dry, free flowing particle consisting essentially of an encapsulating agent for insoluble oils consisting solely of a carboxylated dextrin, said dextrin having a total carboxyl group content of from 0.15% to 1.25%, by weight, and a water insoluble oil entrapped therein, said carboxylated dextrin being derived from a starch selected from the class consisting of cereal starches.

References Cited by the Examiner

UNITED STATES PATENTS

| | | | |
|---|---|---|---|
| 974,448 | 11/10 | Supf | 106—135 |
| 1,942,544 | 1/34 | Fuller | 127—38 |
| 2,667,268 | 1/54 | Griffin | 167—83 XR |
| 2,800,458 | 7/57 | Green | 252—316 |
| 2,824,807 | 2/58 | Laster et al. | 99—140 XR |

JULIUS GREENWALD, *Primary Examiner.*